(12) United States Patent
Field (10) Patent No.: US 8,062,499 B2
(45) Date of Patent: Nov. 22, 2011

(54) CHARGE MOVEMENT DETECTOR FOR ELECTROCHEMICALLY ACTIVATED LIQUIDS

(75) Inventor: Bruce F. Field, Golden Valley, MN (US)

(73) Assignee: Tennant Compnay, Minneapolis, MN (US)

( * ) Notice: Subject to any disclaimer, the term of this patent is extended or adjusted under 35 U.S.C. 154(b) by 263 days.

(21) Appl. No.: 12/435,836

(22) Filed: May 5, 2009

(65) Prior Publication Data

US 2009/0272652 A1  Nov. 5, 2009

Related U.S. Application Data

(60) Provisional application No. 61/050,462, filed on May 5, 2008.

(51) Int. Cl.
 *C25B 15/02* (2006.01)
 *C25B 15/08* (2006.01)
(52) U.S. Cl. ......... 205/337; 205/335; 205/464; 205/341
(58) Field of Classification Search .................. 204/252, 204/275.1, 278.5, 229.8, 228.6, 255, 257, 204/263, 269; 205/335, 337, 341, 464
 See application file for complete search history.

(56) References Cited

U.S. PATENT DOCUMENTS

| | | | |
|---|---|---|---|
| 5,103,165 A | 4/1992 | Sirattz | |
| 5,590,439 A | 1/1997 | Alazet | |
| 6,100,679 A | 8/2000 | McCasland | |
| 6,132,572 A | 10/2000 | Kim | |
| 6,231,747 B1 | 5/2001 | Fukuzuka et al. | |
| 6,315,886 B1 | 11/2001 | Zappi et al. | |
| 6,379,628 B2 | 4/2002 | de Jong et al. | |
| 6,502,766 B1 | 1/2003 | Streutker et al. | |
| 6,719,891 B2 | 4/2004 | Ruhr et al. | |
| 6,855,233 B2 | 2/2005 | Sawada | |
| 6,921,743 B2 | 7/2005 | Scheper et al. | |
| 6,926,819 B2 | 8/2005 | Shinichi et al. | |
| 6,964,739 B2 | 11/2005 | Boyd et al. | |
| 6,974,561 B1 | 12/2005 | Thomason | |
| 7,011,739 B2 | 3/2006 | Harkins et al. | |
| 7,156,962 B2 | 1/2007 | Koizumi et al. | |
| 7,160,472 B2 | 1/2007 | Vliet et al. | |
| 7,226,542 B2 | 6/2007 | Zemel et al. | |
| 7,242,173 B2 * | 7/2007 | Cavoretto | ................ 324/72.5 |
| 2002/0023847 A1 | 2/2002 | Natsume | |
| 2003/0159230 A1 | 8/2003 | Oh | |
| 2003/0213505 A1 | 11/2003 | Price et al. | |
| 2004/0168933 A1 | 9/2004 | Inoue | |
| 2004/0256247 A1 | 12/2004 | Carson et al. | |
| 2005/0126928 A1 | 6/2005 | Hung et al. | |
| 2005/0139808 A1 | 6/2005 | Alimi | |
| 2005/1039239 | 6/2005 | Prae | |
| 2005/0244556 A1 | 11/2005 | Karren | |
| 2006/0037869 A1 | 2/2006 | Mitchke | |
| 2006/0076248 A1 | 4/2006 | Kindred | |
| 2006/0169575 A1 | 8/2006 | Sumita | |
| 2006/0280664 A1 | 12/2006 | Huang et al. | |
| 2007/0023273 A1 | 2/2007 | Kitaori et al. | |
| 2007/0141434 A1 | 6/2007 | Joshi et al. | |
| 2007/0186368 A1 * | 8/2007 | Field et al. | ................ 15/320 |
| 2008/0264778 A1 | 10/2008 | Joshi et al. | |
| 2009/0314651 A1 * | 12/2009 | Field | ................ 205/335 |

FOREIGN PATENT DOCUMENTS

| | | |
|---|---|---|
| CN | 1845877 A | 10/2006 |
| CN | 200977495 Y | 11/2007 |
| DE | 8430251 U1 | 6/1984 |
| DE | 202004010572 U1 | 11/2004 |
| DE | 202007004181 U1 | 8/2007 |
| EP | 0396107 A2 | 11/1990 |
| EP | 0663176 A1 | 7/1995 |
| EP | 761235 B1 | 3/1997 |
| EP | 1000554 B1 | 5/2000 |
| EP | 1293481 B1 | 3/2003 |
| EP | 1351062 A2 | 10/2003 |
| EP | 1309519 B1 | 9/2004 |
| EP | 1533041 A1 | 5/2005 |
| EP | 1741676 A2 | 1/2007 |
| EP | 1903128 A2 | 3/2008 |
| EP | 1941912 A1 | 7/2008 |
| FR | 2909370 A1 | 6/2008 |
| GB | 2405644 A | 3/2005 |
| JP | 5245474 | 9/1993 |
| JP | 1997174054 A | 7/1997 |
| JP | 11010159 A | 1/1999 |
| JP | 2000079393 A | 3/2000 |
| JP | 2003062573 A | 3/2003 |
| JP | 2003181338 A | 7/2003 |
| JP | 2003261190 A | 9/2003 |
| JP | 2003266073 A | 9/2003 |
| JP | 2003334557 A | 11/2003 |
| JP | 2004148108 A | 5/2004 |
| JP | 2004148109 A | 5/2004 |
| KR | 20010096847 A | 11/2001 |
| KR | 100599229 | 7/2006 |
| NL | 1012257 C2 | 12/2000 |
| WO | 9908719 A2 | 2/1999 |
| WO | 9963843 A1 | 12/1999 |
| WO | 0214228 A2 | 2/2002 |
| WO | 02066382 A1 | 8/2002 |
| WO | 2004106242 A1 | 12/2004 |
| WO | 2005014058 A1 | 2/2005 |
| WO | 2005012186 A1 | 2/2006 |
| WO | 2008032544 A1 | 3/2008 |
| WO | 2008061546 A1 | 5/2008 |
| WO | 2008131389 A1 | 10/2008 |

OTHER PUBLICATIONS

International Search Report and Written Opinion dated Dec. 21, 2009 for corresponding International Application No. PCT/US/2009/042866, filed May 5, 2009.

\* cited by examiner

*Primary Examiner* — Bruce Bell (74) *Attorney, Agent, or Firm* — David D. Brush; Westman, Champlin & Kelly, P.A.

(57) ABSTRACT

A method and apparatus are provided for energizing an electrolysis cell receiving a liquid to be electrochemically activated and contacting the liquid with an exposed, conductive tip of a voltage detector. The voltage detector generates a humanly-perceptible indicator as a function of charge movement sensed by the voltage detector through the liquid.

15 Claims, 6 Drawing Sheets

CHARGE MOVEMENT DETECTOR FOR ELECTROCHEMICALLY ACTIVATED LIQUIDS

CROSS-REFERENCE TO RELATED APPLICATION

The present application is based on and claims the benefit of U.S. Provisional Patent Application No. 61/050,462, filed May 5, 2008, the content of which is hereby incorporated by reference in its entirety.

FIELD OF THE DISCLOSURE

The present disclosure relates to electrochemical activation of fluids and, more particularly, to methods and apparatus for testing functionality of an electrolysis cell.

BACKGROUND

Electrolysis cells are used in a variety of different applications for changing one or more characteristics of a fluid. For example, electrolysis cells have been used in cleaning/sanitizing applications, medical industries, and semiconductor manufacturing processes. Electrolysis cells have also been used in a variety of other applications and have had different configurations.

For cleaning/sanitizing applications, electrolysis cells are used to create anolyte electrochemically activated (EA) liquid and/or catholyte EA liquid. Anolyte EA liquids have known sanitizing properties, and catholyte EA liquids have known cleaning properties. Examples of cleaning and sanitizing systems are disclosed in Field et al. U.S. Publication No. 2007/0186368 A1, published Aug. 16, 2007.

While the electrochemically-activated output liquid from an electrolysis cell can have enhanced properties, such as cleaning and/or sanitizing properties, the output liquid may not appear different from a normal, non-electrochemically liquid. Therefore, it can be difficult to determine by visually inspecting the liquid itself whether the liquid is functionally active.

The present disclosure is directed to methods and apparatus for testing electrolysis cells and indicating whether the output liquid is active.

The discussion above is merely provided for general background information and is not intended to be used as an aid in determining the scope of the claimed subject matter.

SUMMARY

An aspect of the disclosure is directed to a method comprising energizing an electrolysis cell receiving a liquid to be electrochemically activated and contacting the liquid with an exposed, conductive tip of a voltage detector. The voltage detector generates a humanly-perceptible indicator as a function of charge movement sensed by the voltage detector through the liquid.

Another aspect of the disclosure is directed to a method comprising receiving a non-contacting voltage detector, which includes a conductive electrode tip, which is electrically insulated from a surrounding environment by a dielectric barrier; and removing at least a portion of the dielectric barrier to expose at least a portion of the conductive electrode tip.

A further aspect of the disclosure is directed to an apparatus for testing an electrolysis cell with a modified non-contact voltage detector.

In a particular example, the method further includes: dispensing the electrochemically-activated liquid from an apparatus such that the dispensed liquid forms an electrical conduction path to at least one electrode within the electrolysis cell; and performing the step of contacting at a location along the conductive path that is external to the apparatus.

In a further, exemplary aspect, the method includes: dispensing comprises dispensing the electrochemically-activated liquid from an apparatus to a surface or container; and contacting comprises contacting the dispensed liquid along the electrical conduction path at a location between the apparatus and the surface or container.

In yet another exemplary aspect, dispensing includes dispensing the electrochemically-activated liquid from the apparatus to a surface or container such that the conduction path extends from the at least one electrode to the dispensed liquid that is collected on the surface or in the container; and contacting includes contacting the dispensed liquid that is collected on the surface or in the container with the exposed tip of the detector.

In yet another exemplary aspect, contacting includes contacting the dispensed liquid that is collected on the surface or in the container with the exposed tip of the detector at an area on the surface or in the container remote from direct contact by a stream of the dispensed liquid extending directly from the apparatus to the surface or container.

In yet another exemplary aspect, dispensing includes dispensing the electrochemically-activated liquid from an apparatus as an output stream; and contacting includes contacting the output stream with the exposed tip.

In a further exemplary aspect, the output stream comprises an output spray dispensed from a spray nozzle, such as an atomized output spray.

In a further exemplary aspect, the apparatus is selected from the group comprising a mobile floor surface cleaner and a hand-held spray bottle, wherein the apparatus carries the electrolysis cell.

In a further exemplary aspect, the electrochemically-activated liquid is dispensed from the apparatus into a container that is physically unconnected to the apparatus, such that the dispensed liquid forms an electrical conduction path between the liquid collected in the container and at least one electrode within the electrolysis cell. The step of contacting is performed with liquid collected within the container.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

An aspect of the present disclosure is directed to a method and apparatus for testing functionality of an electrolysis cell through charge movement in electrochemically-activated liquids and providing an indicator that represents whether the cell is operating correctly.

1. Electrolysis Cells

An electrolysis cell includes any fluid treatment cell that is adapted to apply an electric field across the fluid between at least one anode electrode and at least one cathode electrode. An electrolysis cell can have any suitable number of electrodes, any suitable number of chambers for containing the fluid, and any suitable number of fluid inputs and fluid outputs. The cell can be adapted to treat any fluid (such as a liquid or gas-liquid combination). The cell can include one or more ion-selective membranes between the anode and cathode or can be configured without any ion selective membranes. An electrolysis cell having an ion-selective membrane is referred to herein as a "functional generator".

Electrolysis cells can be used in a variety of different applications and can have a variety of different structures, such as but not limited to those disclosed in Field et al. U.S. Patent Publication No. 2007/0186368, published Aug. 16, 2007.

2. Electrolysis Cell Having a Membrane

Figure 1:
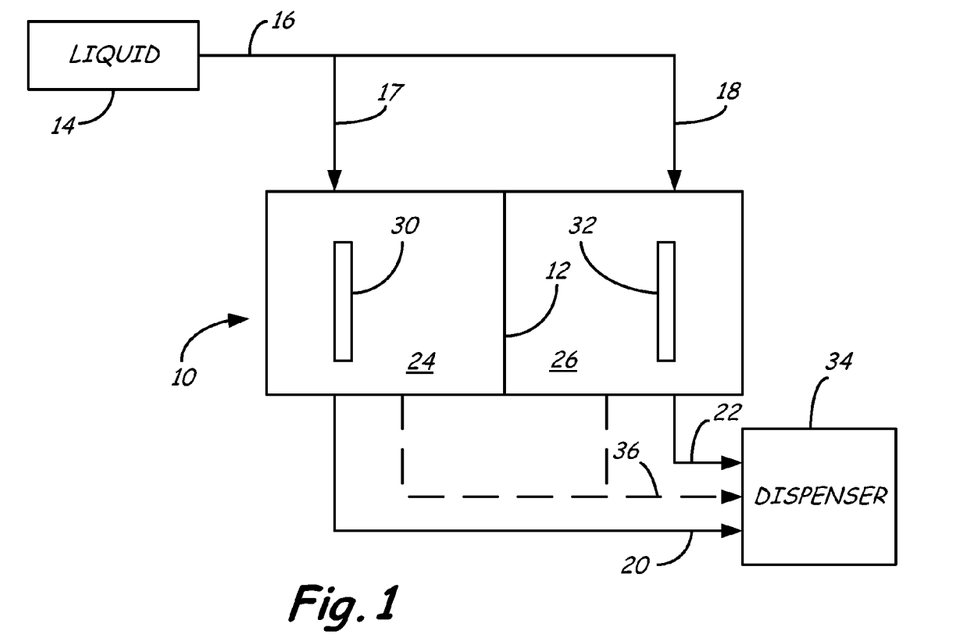
FIG. 1 illustrates an example of an electrolysis cell having an ion-selective membrane.

FIG. 1 illustrates an example of an electrolysis cell 10 having an ion-selective membrane 12 and which receives liquid to be treated from a liquid source 14 through feed lines 16, 17 and 18. Liquid source 14 can include a tank or other solution reservoir or can include a fitting or other inlet for receiving a liquid from an external source. In an example, the liquid to be treated includes an aqueous composition, such as regular tap water.

Cell 10 has one or more anode chambers 24 and one or more cathode chambers 26 (known as reaction chambers), which are separated by ion exchange membrane 12, such as a cation or anion exchange membrane. One or more anode electrodes 30 and cathode electrodes 32 (one of each electrode shown) are disposed in each anode chamber 24 and each cathode chamber 26, respectively. The anode and cathode electrodes 30, 32 can be made from any suitable material, such as titanium or titanium coated with a precious metal, such as platinum, or any other suitable electrode material. The electrodes and respective chambers can have any suitable shape and construction. For example, the electrodes can be flat plates, coaxial plates, rods, or a combination thereof. Each electrode can have, for example, a solid construction or can have one or more apertures, such as a metallic mesh. In addition, multiple cells 10 can be coupled in series or in parallel with one another, for example.

The electrodes 30, 32 are electrically connected to opposite terminals of a conventional power supply (not shown). Ion exchange membrane 12 is located between electrodes 30 and 32. The power supply can provide a constant DC output voltage, a pulsed or otherwise modulated DC output voltage, or a pulsed or otherwise modulated AC output voltage to the anode and cathode electrodes. The power supply can have any suitable output voltage level, current level, duty cycle or waveform.

For example in one embodiment, the power supply applies the voltage supplied to the plates at a relative steady state. The power supply includes a DC/DC converter that uses a pulse-width modulation (PWM) control scheme to control voltage and current output. Other types of power supplies can also be used, which can be pulsed or not pulsed and at other voltage and power ranges. The parameters are application-specific.

During operation, feed water is supplied from source 14 to both anode chamber 24 and cathode chamber 26 via feed water supply line 16, which can be branched into anode supply line or manifold 17 and cathode supply line or manifold 18. The anode supply line 17 supplies the feed water to each anode chamber 24, and the cathode supply line 18 supplies the feed water to each cathode chamber. In another example, electrodes 30 and 32 are placed in a vessel containing the liquid to be treated.

In the case of a cation exchange membrane, upon application of a DC voltage potential across anode 30 and cathode 32, such as a voltage in a range of about 5 Volts (V) to about 25V, cations originally present in the anode chamber 24 move across the ion-exchange membrane 12 towards cathode 32 while anions in anode chamber 24 move towards anode 30. Similarly, cations present in the cathode chamber 26 move towards cathode 32. However, anions present in cathode chamber 26 are not able to pass through the cation-exchange membrane, and therefore remain confined within cathode chamber 26.

As a result, cell 10 electrochemically activates the feed water by at least partially utilizing electrolysis and produces electrochemically-activated water in the form of an acidic anolyte composition 20 and a basic catholyte composition 22.

3. Ion Exchange Membrane

As mentioned above, the ion exchange membrane 12 can include a cation exchange membrane or an anion exchange membrane. Examples of typical cation-exchange membranes that can be used in cell 10 include Nafion membranes from DuPont, USA, Flemion membranes from Asahi Glass Co., Japan, Aciplex membranes from Asahi Chemical Industries Co., Japan and Dow membranes from Dow Chemical, USA. However, any ion exchange membrane can be used in other examples.

4. Dispenser

The anolyte and catholyte EA liquid outputs can be coupled to a dispenser 34, which can include any type of dispenser or dispensers, such as an outlet, fitting, spigot, spray head, a cleaning/sanitizing tool or head, etc. There can be a dispenser for each output 20 and 22 or a combined dispenser for both outputs.

In one example, the anolyte and catholyte outputs are blended into a common output stream 36, which is supplied to dispenser 34. As described in Field et al. U.S. Patent Publication No. 2007/0186368, it has been found that the anolyte and catholyte can be blended together within the distribution system of a cleaning apparatus and/or on the surface or item being cleaned while temporarily retaining beneficial cleaning and sanitizing properties. Although the anolyte and catholyte are blended, they are initially not in equilibrium and therefore temporarily retain their enhanced cleaning and sanitizing properties.

5. Electrolysis Cell with No Ion-Selective Membrane

Figure 2:
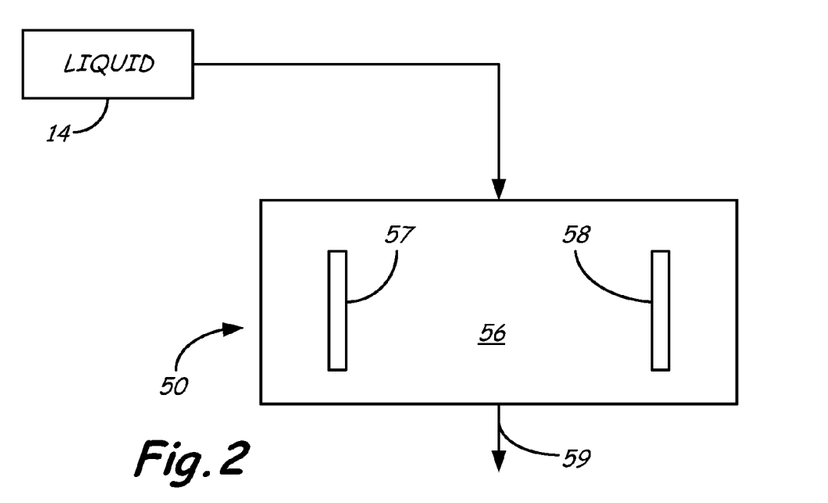
FIG. 2 illustrates an electrolysis cell having no ion-selective membrane according to a further example of the disclosure.

FIG. 2 illustrates an electrolysis cell 50 having no ion-selective membrane according to a further example of the disclosure. Cell 50 includes a reaction chamber 56, an anode 57 and a cathode 58. Chamber 56 can be defined by the walls of cell 50, by the walls of a container or conduit in which electrodes 57 and 58 are placed, or by the electrodes themselves, for example. Anode 57 and cathode 58 may be made from any suitable material or a combination of materials, such as titanium or titanium coated with a precious metal, such as platinum. Anode 57 and cathode 58 are connected to a conventional electrical power supply (not shown). In one embodiment, electrolytic cell 50 includes its own container that defines chamber 56 and is located in the flow path of the liquid to be treated, such as within the flow path of a cleaning apparatus.

During operation, liquid is supplied by a source 14 and introduced into reaction chamber 56 of electrolysis cell 50. In the embodiment shown in FIG. 2, electrolysis cell 50 does not include an ion exchange membrane that separates reaction products at anode 57 from reaction products at cathode 58. In the example in which tap water is used as the liquid to be treated for use in cleaning, after introducing the water into chamber 56 and applying a voltage potential between anode 57 and cathode 58, water molecules in contact with or near anode 57 are electrochemically oxidized to oxygen ($O_2$) and hydrogen ions ($H^+$) while water molecules in contact or near cathode 58 are electrochemically reduced to hydrogen gas ($H_2$) and hydroxyl ions ($OH^-$). Other reactions can also occur and the particular reactions depend on the components of the liquid. The reaction products from both electrodes are able to mix and form an oxygenated fluid 59 (for example) since there is no physical barrier, for example, separating the reaction products from each other. Alternatively, for example, anode 57 can be separated from cathode 58 by using a dielectric barrier such as a non-permeable membrane (not shown) disposed between the anode and cathode.

6. Functionality Tester

It is difficult to determine from observing the output liquid produced by an electrolysis cell (such as those shown in FIGS. 1 and 2) whether the cell is actually functioning and thus whether the liquid has the desired working properties (such as an altered pH or oxidation reduction potential and/or an increased level of dispersed gas bubbles). Also, depending on the environment in which the apparatus is used, it may be difficult or cumbersome to measure these working properties. For example, when the anolyte and catholyte liquids are blended together, the non-equilibrium properties of the blended liquid neutralize after a relatively short period of time, such as after about a minute, which makes any measurement of the temporary properties more difficult.

In one example of the disclosure, a modified non-contact voltage detector is used to test the output liquid from an electrolysis cell and generate a signal (such as aural, tactile and/or visual) that indicates whether the cell is functioning correctly. In effect, a modified non-contact voltage detector detects electrical charge movement, or conduction, between the electrodes in the cell, as detected through the output liquid. Hence, if the detector responds with an aural, tactile and/or visual response, the electrolysis cell is functioning as designed and therefore the output liquid is being electrochemically activated.

In one example, a capacitive-type non-contact voltage detector is used, whereby the metal electrode in the tip of the tool acts as one of the electrodes in a capacitor, while the air or other insulator acts as the dielectric between the detector electrode and the charge source. For example, the device senses AC electric fields through capacitive coupling. The device is sensitive to extremely low levels of charge movement in its electrode.

The modified non-contact voltage detector, when placed into an output stream from an electrolysis cell, will be sensitive to small electrical potentials induced by the cell's electrodes and electrically conducting through the water. An electrical potential applied through the cell will be easily detected by directly placing the modified detector in the output stream at nearly any position as long as there is an unbroken conductive liquid path from the cell electrodes to the outlet at which the test is performed, for example. If the modified detector is not responding, this could indicate that the liquid path has been broken or that the electrolysis cell is not functioning, for example.

Any non-contacting voltage detector, such as an AC non-contacting detector, can be modified and used to perform the test. Contacting detectors can also be used. Examples include the voltage detection stick disclosed in U.S. Pat. No. 6,424,139 (which is hereby incorporated by reference in its entirety) and commercially-available products such as the 50V-1000V GT-11 Non-Contact Voltage Detector from Greenlee Textron Inc., the CEN-TECH 70V-1000V Non-Contact Voltage Tester available from Harbor Freight Tools under item number 97218 (as of the filing date of the present application), the TPI 40 low AC voltage detector available from Test Products International, Inc., the Non-Contact Voltage Sensor available from Sperry Instruments, and the Fluke Volt Alert AC Non Contact Voltage Tester available from Fluke Corporation. Another example is shown in U.S. Pat. No. 7,242,173, which has a non-contacting version with an electrically-isolated tip and a contacting version with an electrically-exposed tip.

Figure 3:
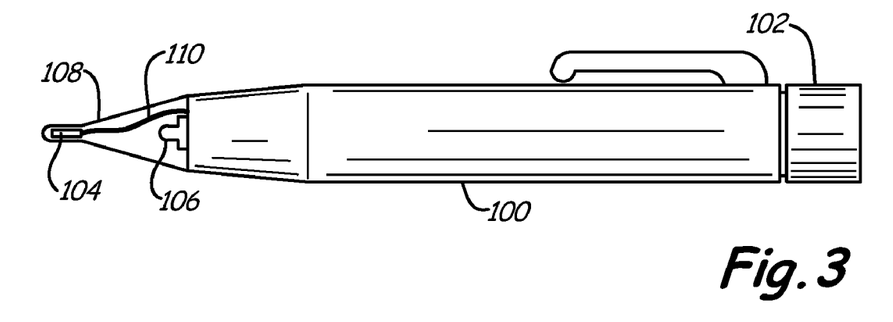
FIG. 3 is a diagram illustrating an example of a non-contact voltage detector, which can be modified to test the electrolysis cells shown in FIGS. 1 and 2, for example.

FIG. 3 is a diagram illustrating an example of a non-contact voltage detector 100, which can be modified to perform the test described above. Detector 100 is in the shape of a hand-held pen-type detector "stick". Detector 100 has an on-off switch 102, a tip 104, and an LED indicator 106. Switch 102 rotates about its axis to switch the detector on and off. The pen housing may contain a battery for powering the detector and a suitable electrical circuit for lighting the LED upon detection of a charge having characteristics within a predetermined range. Tip 104 is made of an electrically-conductive material but is electrically insulated from the surrounding environment by a dielectric housing 108 (such as a clear polymeric material). Tip 104 forms an "antenna" for making non-contact voltage measurements through housing 108. Tip 104 is electrically connected to sensing circuitry within detector 100 through a wire 110. When a sufficient voltage has been detected, the sensing circuitry lights LED 106. Detector 100 can be adapted to generate any other humanly perceptible indicator in response to the detected voltage. Examples of other signals that can be generated in addition to or in replace of a visually-perceptible signal include an audible signal, a vibratory signal, etc.

In this example, detector 100 is characterized by not having a corresponding return electrode of opposite polarity than tip 104.

Figure 4:
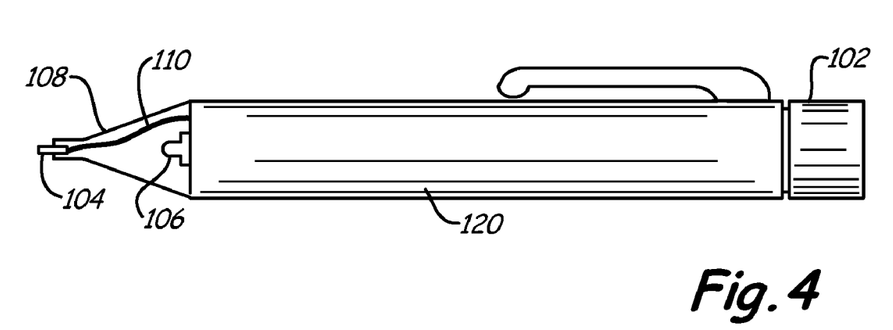
FIG. 4 illustrates a non-contact voltage detector, which has been modified into a contact voltage detector for making contact voltage measurements through the output liquid of an electrolysis cell, according to an example of the present disclosure.

FIG. 4 illustrates a non-contact voltage detector 120, which has been modified into a contact voltage detector for making contact voltage measurements through the output liquid of an electrolysis cell, according to an example of the present disclosure. The same reference numerals are used in FIG. 4 as were used in FIG. 3 for the same or similar elements.

Detector 120 has been modified by removing a portion of the housing 108 to expose at least a portion of conductive tip 104. In addition, if housing 108 has any ventilation holes these holes and any holes created by exposing the tip can be sealed if necessary to prevent the liquid being tested from entering housing 108 and potentially damaging the sensing circuitry or electrically shorting contacts in the detector. For example, a bead of silicone caulk can be applied about the base of tip 104 at the interface with housing 108 to seal the internal volume of the housing.

Once modified, the exposed, electrically conductive tip 104 can be inserted into the output stream of an electrolysis cell to detect charge movement between the electrodes in the cell. The exposed tip 104 will be sensitive to small electrical potentials induced by the cell's electrodes and electronically conducting through the water. An electrical potential applied through the cell will be easily detected by directly placing the modified detector in the output stream at nearly any position as long as there is an unbroken conductive path through the liquid from the cell electrodes to the outlet at which the test is performed.

If switch 102 is in the ON position and the LED 106 illuminates, then the electrolysis cell is functioning as designed and therefore the output liquid is being electrochemically activated. If the LED 106 does not illuminate, this could indicate that the liquid path has been broken or that the electrolysis cell is not functioning, for example.

Figure 5:
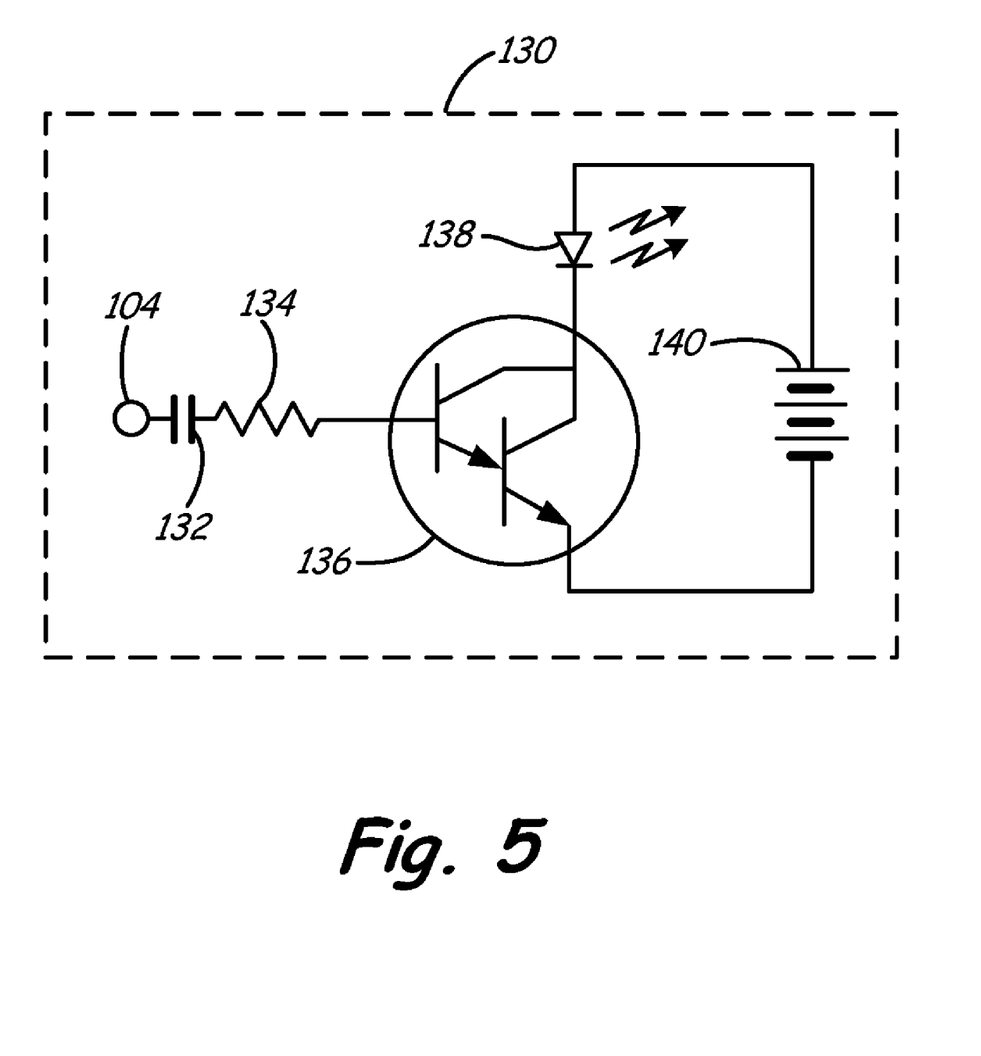
FIG. 5 is a schematic diagram illustrating a simple electrical circuit that can be utilized in the detector for sensing charge.

FIG. 5 is a schematic diagram illustrating a simple electrical circuit 130 that can be utilized in detector 100, 120 for sensing charge through tip 104. Circuit 130 can be contained within the detector housing. Circuit 130 includes a capacitor 132, a resistor 134, a transistor pair 136, and LED 138 and a battery 140. Capacitor 132 is connected in series with resistor 134 between tip 104 and the base of transistor pair 136. In another example, capacitor 132 is eliminated. The collector of transistor pair 136 is connected to the cathode of LED 138, and the cathode of LED is connected to the positive terminal of battery 140. The source of transistor 136 is connected to the negative terminal of battery 140.

When a sufficient charge is applied to tip 104, capacitor 132 charges to a voltage sufficient to turn on transistor 136. When transistor 136 is ON, the transistor conducts current from battery 140 through LED 138, thereby illuminating the LED. When the charge is insufficient to turn on transistor 136, LED remains unlit.

Numerous other electrical circuits can be used to sense charge through tip 104 in other embodiments.

7. Demonstration Apparatus

Figure 6:
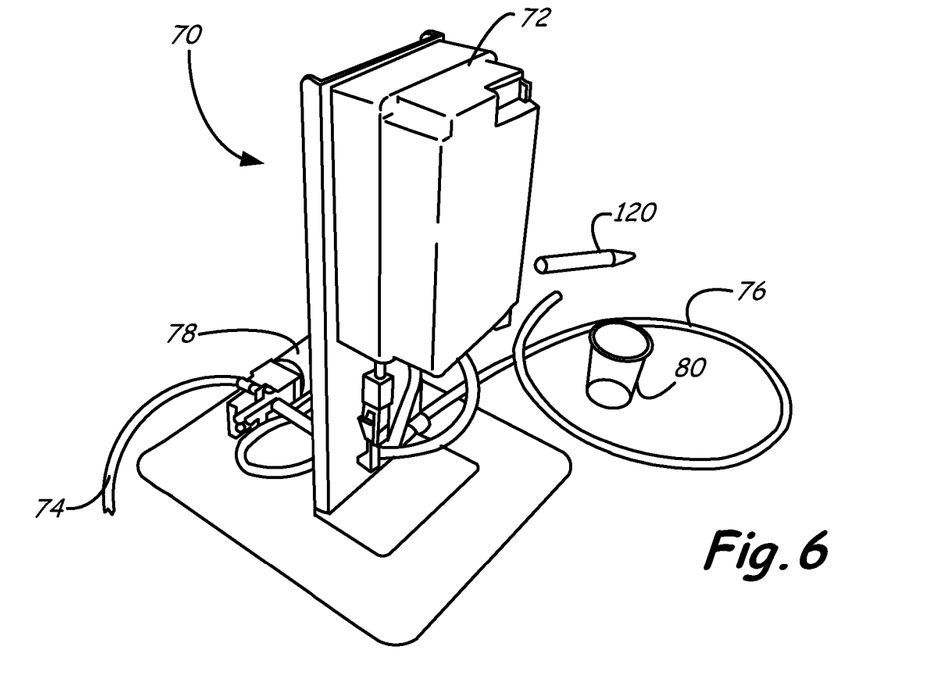
FIG. 6 illustrates an apparatus for demonstrating a test process according to an illustrative example of the present disclosure.

FIG. 6 illustrates an apparatus 70 for demonstrating a test process according to an illustrative example of the present disclosure. The demonstration apparatus 70 includes an electrolysis cell 72, an input tube 74 for receiving a liquid to be treated, an output tube 76 for delivering the treated output liquid, and a pump 78, which when energized pumps the liquid through electrolysis cell 70 from input tube 74 to output tube 76. In this example, the output liquid is dispensed to a small container 80.

Cell 72 is an example of an Emco Tech "JP102" electrolysis cell having an ion-selective membrane and found within the commercially-available product, JP2000 ALKABLUE LX, which is available from Emco Tech Co., LTD, of Yeupdong, Goyang-City, Kyungki-Do, South Korea. This particular cell has a DC range of 27 Volts, a pH range of about 10 to about 5.0, a cell size of 62 mm by 109 mm by 0.5 mm, and five electrode plates. Other types of functional generators can also be used, which can have various different specifications, number of plates, arrangement of plates, shapes of plates, etc.

Figure 7:
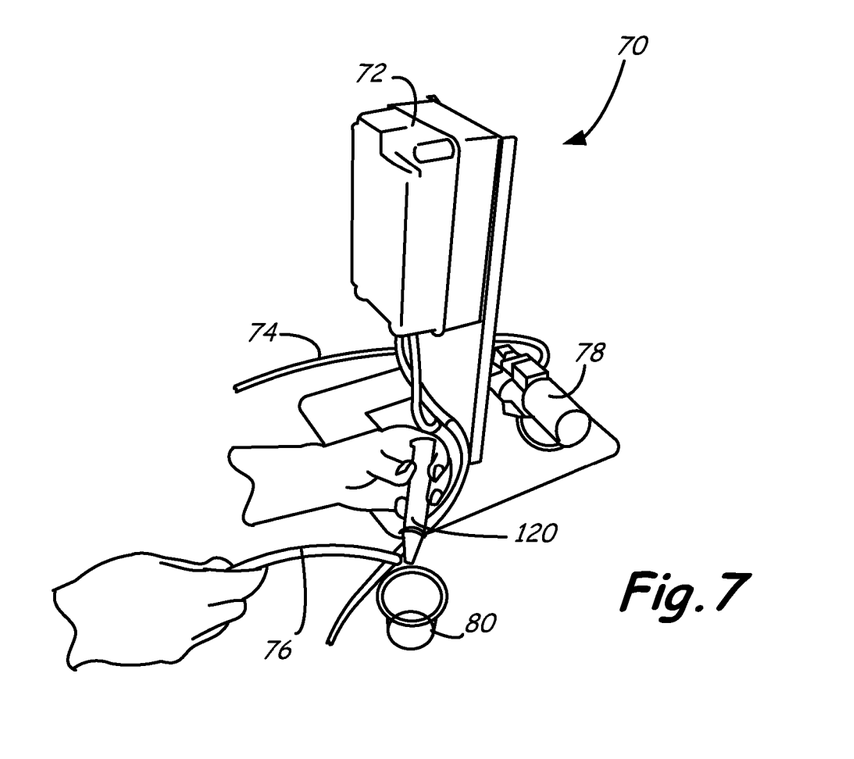
FIG. 7 illustrates another view of the test apparatus shown in FIG. 6 during a test process.
Figure 8:
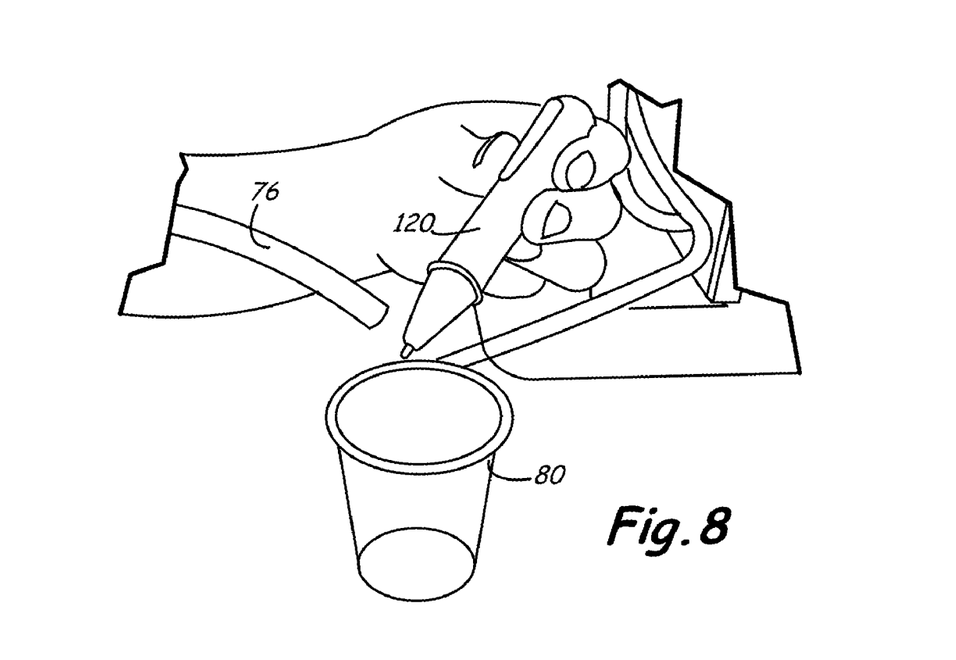
FIG. 8 is a close-up view illustrating the test process shown FIG. 7.

As shown in FIG. 7, to perform the test using apparatus 70, the cell 72 and pump 78 are energized and a user directs the outlet of output tube 76 to container 80. The user holds the exposed tip of modified detector 120 near the outlet. FIG. 8 is a close-up view illustrating the test set-up of FIG. 7.

Figure 9:
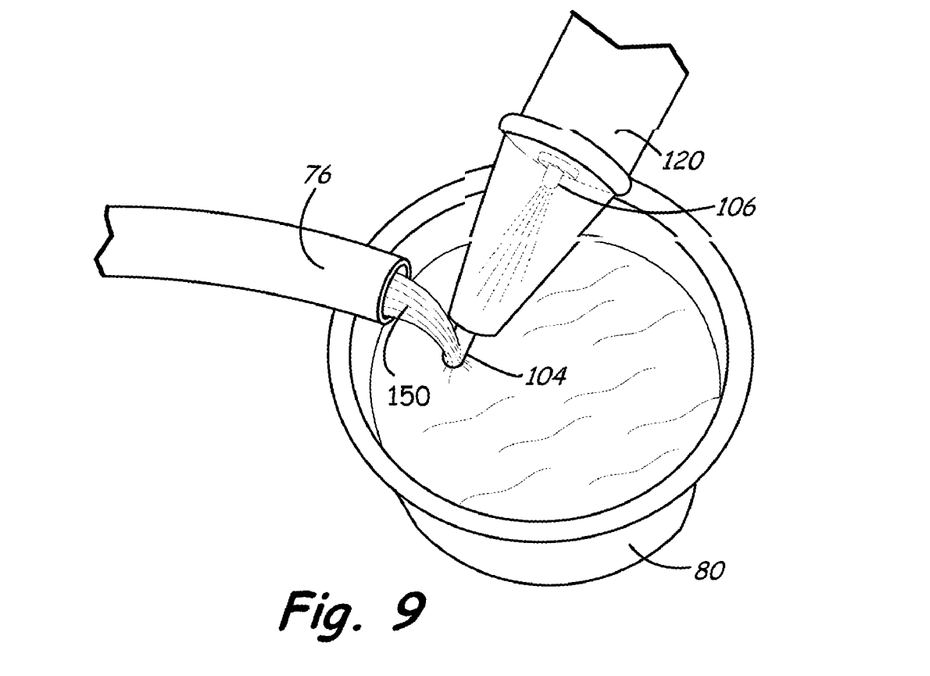
FIG. 9 illustrates an output stream a container, with an exposed tip of the modified voltage detector shown in FIG. 4 contacting the output stream.

FIG. 9 illustrates the output stream 150 from the outlet of tube 76 pouring into container 80, with the exposed tip 104 electrically contacting the output stream. If there is an unbroken conductive path through the liquid from the outlet to the electrodes of cell 72 and if the cell is powered and functioning properly to provide electrical charge movement that is within the detection range of detector 120, LED 106 will illuminate as shown in FIG. 9.

In this example, the exposed tip 104 contacts the dispensed liquid along a portion of the conductive path at which the liquid is not contained by any container, such as a cup or tube. The liquid is uncontained at the outlet of the dispenser and being poured into container 80. In another example, exposed tip 104 can be submerged into, or otherwise in electrical contact with, the liquid collected in container 80. In this example, container is physically and electrically unconnected to the apparatus 70 that generates the electrochemically-activated liquid, other than by the dispensed liquid. As long as the dispensed liquid forms an electrical conduction path between the electrolysis cell electrodes and the liquid collected within container 80, the LED 106 will illuminate if the cell is powered and functioning properly.

The indicator (such as LED 106) can therefore indicate whether the output liquid is electrochemically activated. This test process is simple to perform and can be used to detect electrochemical activation directly at the dispenser of a product, even if the output stream is in a temporary, non-equilibrium state.

The detector can be used to test the reaction products produced by an electrolysis cell having an ion-selective membrane and an electrolysis cell having no ion-selective membrane. For a cell having a membrane, the detector tip can be placed in contact with an anolyte EA liquid output, a catholyte EA liquid output, and/or a blended anolyte and catholyte EA liquid output. Depending on the structure of the cell, the tip can be placed into the liquid in one of the chambers of the cell itself, at the outlet of a chamber, anywhere along a distribution path from the cell, and/or a tank in which the cell is operating, for example.

8. Mobile Surface Cleaner

The above-described test process can be used in a variety of different applications, such as testing the output produced by a mobile surface cleaner, which incorporates an electrolysis cell in the cleaning and/or sanitizing liquid flow path. For example, the detector can be placed in the flow path at the cleaning head or one of the output flow tubes can be disconnected and/or re-directed for testing purposes.

For example, Field et al. U.S. Publication No. 2007/0186368 A1, which is incorporated herein by reference in its entirety, discloses a mobile surface cleaner having a mobile body configured to travel over a surface, a tank for containing a cleaning liquid, such as tap water, a liquid dispenser and a flow path from the tank to the liquid dispenser. An electrolysis cell is coupled in the flow path. The electrolysis cell has an anode chamber and a cathode chamber separated by an ion exchange membrane and electrochemically activates tap water that has passed through the functional generator.

The functional generator converts the tap water into an anolyte EA liquid and a catholyte EA liquid. The anolyte EA liquid and the catholyte EA liquid can be separately applied to the surface being cleaned and/or sanitized, or can be combined on-board the apparatus to form a combination anolyte and catholyte EA liquid and dispensed together. With the above-process, the detector tip is placed in electrical contact with the combined EA liquid output as the machine operates. If the LED illuminates, the onboard electrolysis cell is functioning correctly and this illumination can be used as an indicator that the liquid is being electrochemically activated.

9. Spray Bottle

As mentioned in the Field et al. U.S. Publication No. 2007/0186368 A1, an electrolysis cell can be implemented into or on a spray bottle, such as a hand-triggered spray bottle, wherein the spray bottle contains a liquid to be sprayed on a surface and the electrolysis cell electrochemically-activates the liquid as it is dispensed from a spray nozzle. In an example in which the cell has an ion-selective membrane, the cell converts the liquid to an anolyte EA liquid and a catholyte EA liquid prior to dispensing the converted liquid as an output spray. The anolyte and catholyte EA liquids can be dispensed as a combined mixture or as separate spray outputs, for example.

Again, it is difficult to determine whether the dispensed liquid is in fact electrochemically activated simply by observing the output spray. It has been found that a detector as shown and described herein can be used by, for example, placing the exposed tip in electrical contact with the output spray (or with a liquid on a surface to which the output spray is contacting) to determine whether the electrolysis cell is functioning and therefore whether the output spray is activated.

Figure 10:
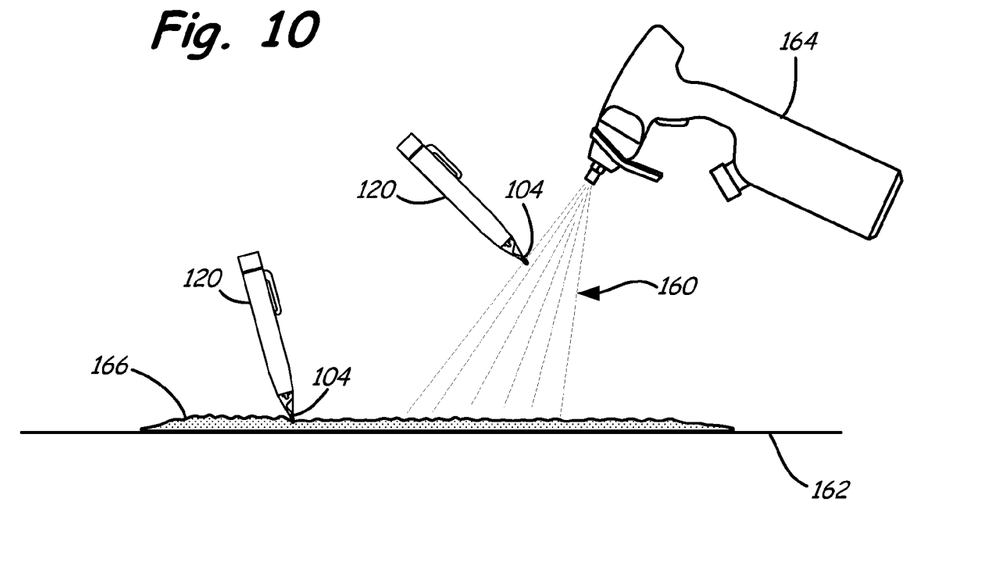
FIG. 10 is a diagram illustrating a method of testing electrochemically-activated liquid being sprayed onto a surface from a spray bottle, which has an electrolysis cell.

FIG. 10 is a diagram, which illustrates an output spray 160 being dispensed onto a surface 162 from the nozzle of a hand-held spray bottle 164 containing an electrolysis cell. In one illustrative example, spray bottle 164 is a commercially-available spray bottle "Activeion Pro" from Activelon Cleaning Solutions, LLC, of Rogers, Minn., U.S.A., and at the web site, www.activeion.com.

In this example, spray bottle 164 includes a reservoir for containing a liquid to be treated (such as regular tap water) and then dispensed through a nozzle. Spray bottle 164 further includes a pump, a trigger-activated switch, control electronics, and batteries. For example, when the user "squeezes" the hand trigger, the trigger actuates the switch. When the switch is in the open, non-conducting state, the control electronics de-energize the electrolysis cell and pump. When the switch is in the closed, conducting state, the control electronics energizes the electrolysis cell and pump. The pump draws liquid from reservoir through the electrolysis cell and forces the liquid out the nozzle.

In one non-limiting example, the electrolysis cell converts the liquid to an anolyte EA liquid and a catholyte EA liquid prior to being dispensed from the bottle 164 as an output spray (or stream, for example) 160. As part of performing the electrolysis process, the electrodes in the electrolysis cell generate an electrical charge in the liquid, which is delivered through an electrically conductive path formed by the liquid in the outlet path of the bottle and by the liquid dispensed as an atomized spray 160, to the surface 162.

This electrical charge conducts through the liquid and spray to the surface 162 and can be detected by detector 120 at any location along the conductive path, such as along the output spray 160 and/or the liquid 166 applied to surface 162, as long as the liquid 166 is in electrical contact with output spray 160. In one example, the exposed tip 104 of detector 120 is placed in physical and electrical contact with output spray 160. In another example, the exposed tip 104 of detector 120 is placed in physical and electrical contact liquid 166, which is in electrical contact with output spray 160. If the electrolysis cell in bottle 164 is energized and functioning properly, the LED within detector 120 will illuminate. If not, the LED will remain unlit.

It has been found that as surface 166 becomes wet with the liquid carried by the output spray 160, the electrical charge conducts throughout and along the wetted surface, as long as there exists a conductive path of liquid between the output spray and various areas on the surface that are remote from direct contact by the output spray. It has been found that an electrical charge can be detected at an area remote from direct contact by the output spray if the surface has a continuous path of liquid between the area of direct contact an the remote area at which the measurement is made.

Figure 11:
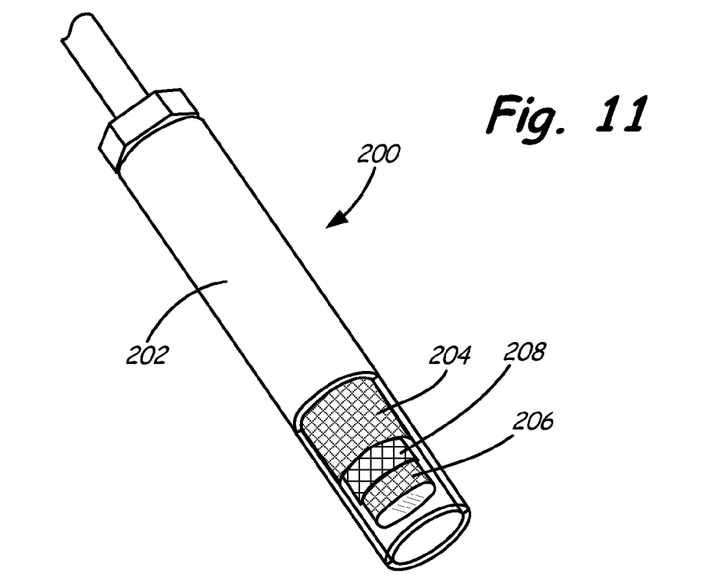
FIG. 11 is a diagram illustrating an example of an electrolysis cell carried by the spray bottle shown in FIG. 10.

FIG. 11 illustrates an example of an electrolysis cell 200 within bottle 164 and having a tubular shape according to one illustrative example. Portions of cell 200 are cut away for illustration purposes. In this example, cell 200 is an electrolysis cell having a tubular housing 202, a tubular outer electrode 204, and a tubular inner electrode 206, which is separated from the outer electrode by a suitable gap, such as 0.020 inches. Other gap sizes can also be used. An ion-selective membrane 208 is positioned between the outer and inner electrodes 204 and 206. In one example, outer electrode 204 and inner electrode 206 have mesh constructions with apertures. However, one or both electrodes can have a solid construction in another example.

In this example, the volume of space within the interior of tubular electrode 206 is blocked to promote liquid flow along and between electrodes 204 and 206 and ion-selective membrane 208. This liquid flow is conductive and completes an electrical circuit between the two electrodes.

In the example shown in FIG. 11, cell 200 produces anolyte EA liquid in the anode chamber (between one of the electrodes 204 or 206 and ion-selective membrane 208) and catholyte EA liquid in the cathode chamber (between the other of the electrodes 204 or 206 and ion-selective membrane 208). The anolyte and catholyte EA liquid flow paths join at the outlet of cell 200. As a result, spray bottle 164 dispenses a blended anolyte and catholyte EA liquid through the nozzle.

Although the present disclosure has been described with reference to one or more embodiments, workers skilled in the art will recognize that changes may be made in form and detail without departing from the spirit and scope of the disclosure and/or the appended claims.

What is claimed is:

1. A method comprising:
   energizing an electrolysis cell on an apparatus, the electrolysis cell receiving a liquid to be electrochemically activated;
   dispensing the electrochemically-activated liquid from the apparatus such that the dispensed liquid forms an electrical conduction path to at least one electrode within the electrolysis cell;
   contacting the liquid with an exposed, conductive tip of a voltage detector at a location along the conductive path that is external to the apparatus, wherein the voltage detector lacks a corresponding return electrode of opposite polarity than the exposed tip; and
   generating a humanly-perceptible indicator with the voltage detector as a function of charge movement generated by the electrolysis cell as sensed by the voltage detector through the liquid.

2. The method of claim 1, wherein:
dispensing comprises dispensing the electrochemically-activated liquid from an apparatus to a surface or container; and
contacting comprises contacting the dispensed liquid along the electrical conduction path at a location between the apparatus and the surface or container.

3. The method of claim 1, wherein:
dispensing comprises dispensing the electrochemically-activated liquid from the apparatus to a surface or container such that the conduction path extends from the at least one electrode to the dispensed liquid that is collected on the surface or in the container; and
contacting comprises contacting the dispensed liquid that is collected on the surface or in the container with the exposed tip of the detector.

4. The method of claim 3, wherein:
contacting comprises contacting the dispensed liquid that is collected on the surface or in the container with the exposed tip of the detector at an area on the surface or in the container that is not in direct contact by a stream of the dispensed liquid extending directly from the apparatus to the surface or container.

5. The method of claim 1, wherein:
dispensing comprises dispensing the electrochemically-activated liquid from an apparatus as an output stream; and
contacting comprises contacting the output stream with the exposed tip.

6. The method of claim 5, wherein the output stream comprises an output spray dispensed from a spray nozzle.

7. The method of claim 6, wherein the output spray comprises an atomized output spray.

8. The method of claim 1, wherein dispensing comprises:
dispensing the liquid from the apparatus, which is selected from the group comprising a mobile floor surface cleaner and a hand-held spray bottle, wherein the apparatus carries the electrolysis cell.

9. The method of claim 1 and further comprising:
dispensing the electrochemically-activated liquid from an apparatus into a container that is physically unconnected to the apparatus, such that the dispensed liquid forms an electrical conduction path between the liquid collected in the container and at least one electrode within the electrolysis cell; and
performing the step of contacting with liquid collected within the container.

10. The method of claim 1 and further comprising the following steps performed before the steps of energizing, dispensing, contacting and generating:
modifying the voltage detector by removing at least a portion of a dielectric barrier, which electrically insulates the conductive tip from a surrounding environment, to expose at least a portion of the conductive electrode tip to the surrounding environment.

11. The method of claim 9 wherein the dielectric barrier forms at least a portion of a housing containing the detector and wherein the method further comprises:
sealing a gap formed between the dielectric barrier and a circumference of the tip that is formed by the step of removing, to prevent liquid from entering an interior of the voltage detector.

12. The method of claim 9 wherein the dielectric barrier forms at least a portion of a housing containing the detector and wherein the housing comprises at least one vent hole, the method further comprising:
sealing the at least one vent hole.

13. A method comprising:
receiving a non-contacting voltage detector, which includes a conductive electrode tip, which is electrically insulated from a surrounding environment by a dielectric barrier;
removing at least a portion of the dielectric barrier to expose at least a portion of the conductive electrode tip, wherein the dielectric barrier forms at least a portion of a housing containing the voltage detector;
sealing a gap formed between the dielectric barrier and a circumference of the tip that is formed by the step of removing, to prevent liquid from entering an interior of the voltage detector;
energizing an electrolysis cell receiving a liquid to be electrochemically activated; and
contacting the liquid with the exposed, conductive tip of the voltage detector.

14. The method of claim 13 wherein the dielectric barrier forms at least a portion of a housing containing the detector and wherein the housing comprises at least one vent hole, the method further comprising:
sealing the at least one vent hole.

15. The method of claim 13 and further comprising:
generating a humanly-perceptible indicator with the voltage detector as a function of charge movement sensed by the voltage detector through the liquid.

* * * * *